United States Patent [19]

Langecker

[11] 4,038,017

[45] July 26, 1977

[54] EXTRUSION HEAD

[75] Inventor: Erhard Langecker, Meinerzhagen, Germany

[73] Assignee: Battenfeld Maschinenfabriken GmbH, Meinerzhagen, Germany

[21] Appl. No.: 663,729

[22] Filed: Mar. 4, 1976

[30] Foreign Application Priority Data

Mar. 6, 1975 Germany .............................. 2510127

[51] Int. Cl.² .............................................. B29F 3/04
[52] U.S. Cl. .................................. 425/466; 425/381; 425/467
[58] Field of Search .................. 264/173, 176 R, 209; 425/380, 381, 466, 467, 133.1; 72/265, 273

[56] References Cited

U.S. PATENT DOCUMENTS

| 3,386,132 | 6/1968 | Fischer | 425/381 |
| 3,520,966 | 7/1970 | Soffiantini | 425/133.1 X |
| 3,522,629 | 8/1970 | Langecker | 425/381 X |

Primary Examiner—Francis S. Husar
Assistant Examiner—Mark Rosenbaum
Attorney, Agent, or Firm—Andrew R. Basile

[57] ABSTRACT

An extrusion head for the manufacture of a hollow string of thermoplastic material whereby the resulting product consists of two concentric layers of the material whose weld seams are staggered in relation to one another, and whose union is accomplished without the two materials being formed into separate tubular layers. Provisions are made to maintain the layers' ratio of wall thickness.

12 Claims, 16 Drawing Figures

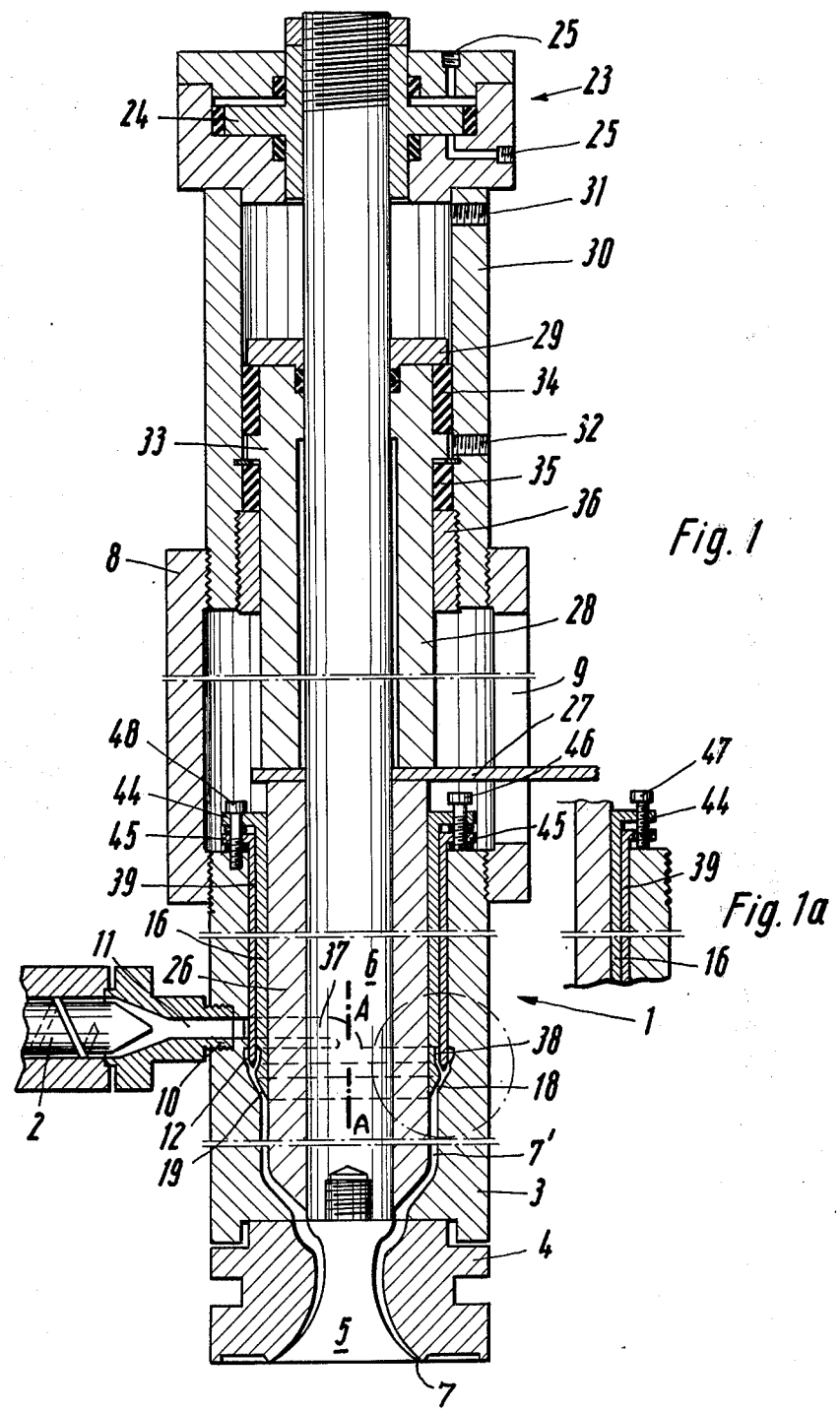

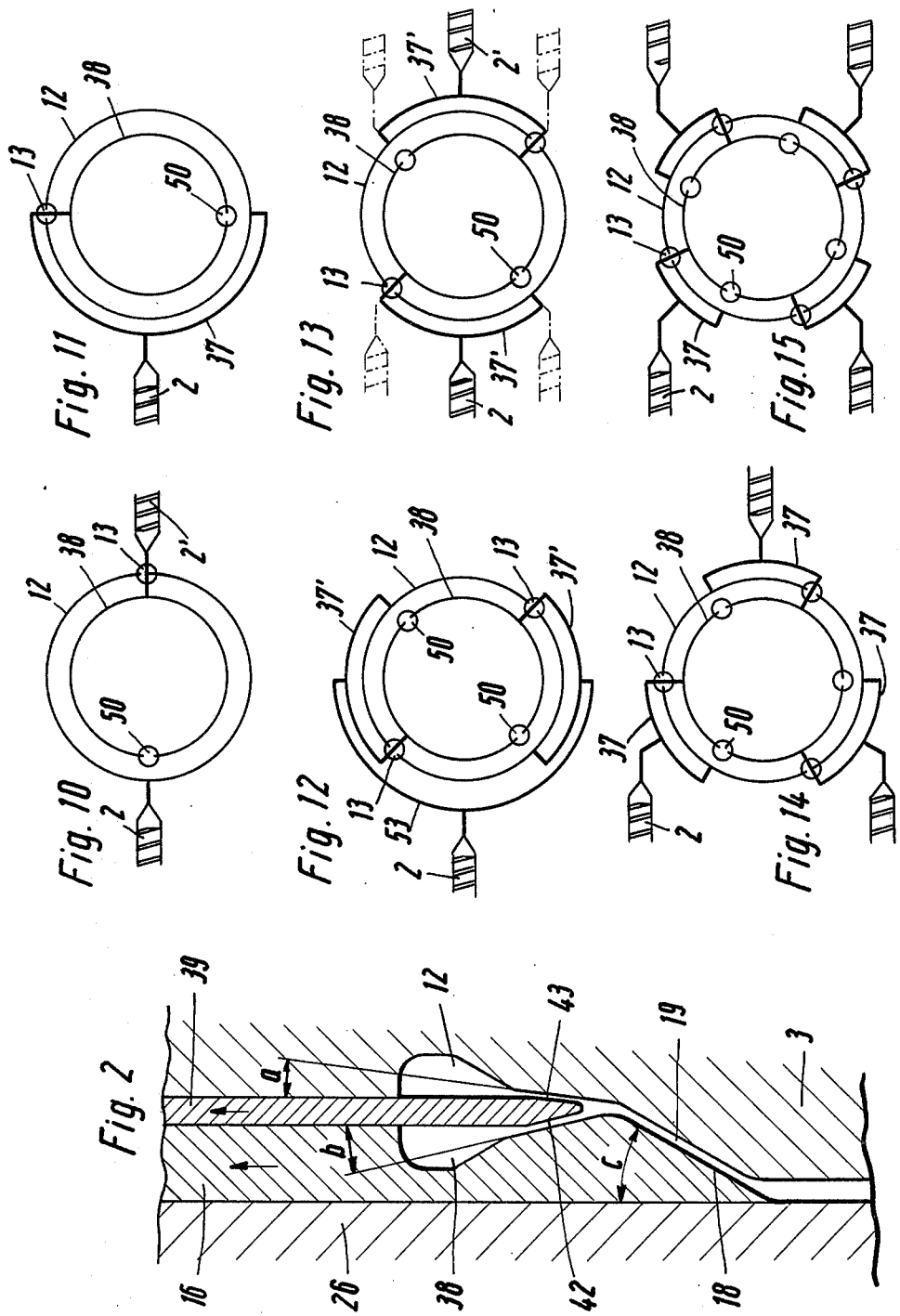

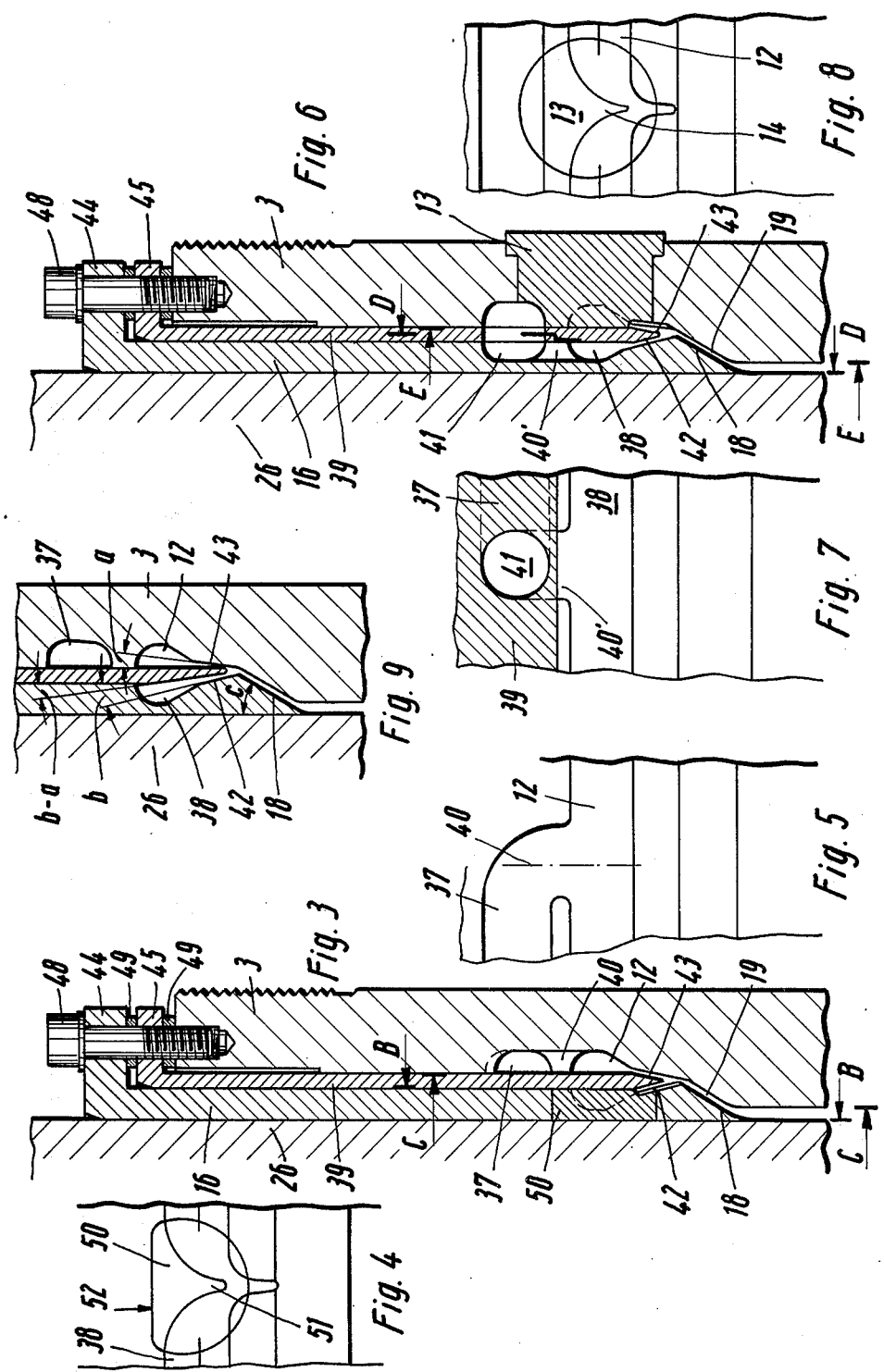

EXTRUSION HEAD

BACKGROUND OF THE INVENTION

I. Field of the Invention

The present invention relates to an extrusion head for the manufacturing of a hollow string of material and, in particular, to an extrusion head which manufactures a two-layered string whose joining seams are circumferentially staggered relative to one another.

II. Description of the Prior Art

An extrusion head (West German Patent No. DT-PS 1,218,708) is known which, in order to manufacture a hollow string of material consisting of two concentric layers, is equipped with two inlet passages located diametrically opposite to one another and perpendicular to the axis of the extrusion head, each inlet passage being fed by its own extruder. The flows of material supplied to the inlet passages are formed into a tube by deflecting them through 90°, the tube forming a seam at the point, opposite the inlet passage, where the flows meet. The two tubes are separated by a sleeve in the extrusion head and united at exit from the head to form a common, two-layered hollow string of material. Because the two inlet passages are disposed diametrically opposite one another, the joining seams are circumferentially staggered through 180° relative to one another. Again, it is known (West German Pat. No. DT-PS 1, 082, 043) to connect the two diametrically opposite inlet passages by means of a semi-circular distribution passage supplied centrally by an extruder.

West German Pat. No. DT-PS 1, 704, 799 discloses an extrusion head having a transversely disposed inlet passage on its inside. This patent also discloses a device for deflecting and distributing the thermoplastic material to a round chamber extending axially vis a vis the extrusion head and having an annular shape due to the presence within it of an axially displaceable annular piston. A sleeve is disposed concentrically vis a vis an axially displaceable die core belonging to the extrusion head, which sleeve forms with its conical end (which is disposed towards the die slot of the extrusion head) an opening for the passage of the thermoplastic material into the ram chamber. This patent also discloses a device for axially displacing the annular piston and a device for axially displacing the die core. To ensure that constant, uniform flow of the plasticized material into the ram head takes place, irrespective of the viscosity and the delivery rate, the device for deflecting and distributing the thermoplastic material consists of an annular groove surrounding the sleeve into which the inlet passage opens and whose internal wall is formed by the sleeve itself, the latter being axially displaceable upon the annular piston relative to same, thereby acting as a stripper. The transfer slot is designed as a variable restrictive slot located between the annular groove and the ram chamber and having a smaller cross section than the annular groove. The advantage of this known extrusion head resides in the fact that, because of the facility for variation of the restrictive slot, the overall cross section of the latter can be adjusted to a particular delivery rate and a specific viscosity, so that adjustment of the annular slot ensures a uniform peripheral mass flow into the ram chamber irrespective of the delivery rate and viscosity of the plasticized material.

SUMMARY OF THE INVENTION

The present invention commences from this last-mentioned known ram head, and its object is to so design the ram head that, while retaining the aforementioned advantages, it makes it possible to manufacture a two-layered hollow string of material and, if required, different materials corresponding to the particular application or materials of different color can be used.

In accordance with the invention, this object is achieved by providing in the external peripheral surface of the sleeve a second annular groove corresponding with the first and located along with the latter in an approximately horizontal central plane. This object is further achieved by providing a longitudinally displaceable separator sleeve of known kind which passes through the two annular grooves and by providing above the two annular grooves two inlet passages which are staggered peripherally in relation to one another, one of which opens into the first annular groove and the other of which opens into the second annular groove through an opening in the separator sleeve. The separator sleeve forms, with its end, which passes through the annular groove, guide slots of identical or different widths, which merge into a restrictive slot. The width of the restrictive slot corresponds with the sum of the width of the guide slots, while the guide slots and the restrictive slot are arranged at such angles to the vertical that, with displacement of the separator sleeve and another sleeve, the width ratios of the guide slots and the restrictive slots are maintained. The advantage of the invention resides in the fact that the two layers are united with one another by welding, via the guide slots formed by the separator sleeve, on entry into the adjoining restrictive slot without the two materials being formed into separate tubular layers, the two layers having a predetermined identical or dissimilar wall thickness in accordance with the design of the head. The wall thickness remains in the same ratio even if, as a consequence of the displacement of the sleeve and the separator sleeve in order to adapt to materials of different viscosity and/or to adapt to a different delivery performance in the part of the extruder, the widths of the guide slots and the restrictive slot are changed. In this fashion, it is possible in all instances to ensure a uniform mass flow both in the guide slots and in the restrictive slot. The same advantage is obtained in an extrusion head where there is no ram chamber adjoining the restrictive slot.

A further feature of the invention is characterized by the fact that where the guide slots have the same width, the sine of the angle $b$ of the guide slots associated with the second annular groove is approximately twice the sine of the angle $a$ of the guide slots associated with the first annular groove, while the sine of the angle $c$ of the restrictive slot is approximately four times the sine of the angle $a$ of the guide slots associated with the first annular groove. These angles, determined by the sine values, ensure that, with displacement of the sleeve and the separator sleeve, the designed ratio between wall thicknesses is maintained. For the same width on the part of the guide slots and twice the width on the part of the restrictive slot, it is possible for example to use the following angles.

At an angle $a$ of 14.5°, the angle $b$ is 30° and the angle $c$ is 90°; at an angle $a$ of 10.2°, the angle $b$ is 20.7° and the angle $c$ is 45°; at an angle $a$ of 7.2°, an angle $b$ of 14.5° and an angle $c$ of 30° are obtained.

The invention is characterized furthermore in that the determination of the angles of identical or dissimilar guide slots and of the angle of the restrictive slot is performed in accordance with the following equations which refer to elements that will be identified hereinafter:

$$\text{(sine } b/\text{sine } a) = 2x \text{ (slot 42/slot 43)} \tag{1}$$

The number 2 corresponds to the ratio of the displacement of the separator sleeve to that of the other sleeve.

$$\text{(sine } c/\text{sine } b) = \text{(slot 19/slot 42)} \tag{2}$$

For the widths, on the part of the two guide slots, determined by the particular desired thicknesses of the layers, the angles can be determined in accordance with the foregoing equations.

Other objects, advantages, and applications of the present invention will become apparent to those skilled in the art of extrusion heads when the accompanying description of several examples of the best mode contemplated for practicing the present invention is read in conjunction with the accompanying drawings.

BRIEF DESCRIPTION OF THE DRAWINGS

The description herein makes reference to the accompanying drawings wherein like reference numerals refer to like parts throughout the several views, and in which:

FIG. 1 is a vertical sectional view through an extrusion head constructed in accordance with the principles of the present invention;

FIG. 1a is a fragmentary view of the extrusion head in FIG. 1;

FIG. 2 is an enlarged fragmentary view of the extrusion head corresponding to the circled fragment shown in FIG. 1;

FIG. 3 is a partially sectional view taken along line A—A of FIG. 1 through the back wall of the extrusion head;

FIG. 4 is a fragmentary sectional view of the extrusion head taken along Line B—B of FIG. 3;

FIG. 5 is a fragmentary sectional view of the extrusion head taken along Line C—C of FIG. 3;

FIG. 6 is a fragmentary sectional view of the extrusion head in FIG. 3 through the opposite side of the extrusion head;

FIG. 7 is a fragmentary sectional view of the extrusion head taken along line D—D of FIG. 6;

FIG. 8 is a fragmentary sectional view of the extrusion head taken along Line E—E of FIG. 6;

FIG. 9 is a fragmentary sectional view of a modified embodiment of the extrusion head as viewed in FIG. 2; and FIGS. 10 to 15 are schematic illustrations of different methods of supplying a plasticized synthetic material to the annular grooves of the extrusion heads illustrated in FIGS. 1 to 9.

DESCRIPTION OF THE PREFERRED EMBODIMENTS

Referring now to FIG. 1 wherein there is illustrated one example of the present invention in the form of an extrusion head 1 connected to a transversely directed plasticizer 2. The extrusion head 1 consists of a housing 3 below which is located a die housing 4. The die center 5, which is attached to a die core 6, and the die housing 4 together form an annular opening 7. Around the die core 6 an annular piston 26 is arranged. The annular piston 26 is surrounded by a sleeve 16. The plasticizer 2 has a threaded connection 10 which is screwed into the housing 3. The threaded connection 10 possesses a discharge passage 11 for the plasticized material produced by the plasticizer 2. The material passes through the discharge passage 11 into a semi-circular passage 37. Beneath the semi-circular passage 37 an annular groove 12 is machined in the internal wall of the housing 3. In the sleeve 16 a second annular groove 38 is machined which corresponds with annular groove 12 and is located along with the latter in an approximately horizontal plane. The annular grooves 12 and 38 are traversed by a separator sleeve 39 arranged between the housing 3 and the sleeve 16. As FIGS. 3 and 5 show, one end of the semi-circular passage 37 is connected with the annular groove 12 via an opening 40 in the housing 3, said opening doing duty as an inlet passage; the other end of the annular passage 37 is connected with the annular groove 38 through an opening 41 in the separator sleeve 39 and an opening 40' in the sleeve 16, said latter opening doing duty as an inlet passage. In this fashion, the plasticized material delivered from the extruder 2 to the semi-circular passage 37 is supplied simultaneously to the two annular grooves 12 and 38.

As can best be seen in FIG. 2, the bottom end of the separator sleeve 39 forms two guide slots 42 and 43 in association with the outlets of the annular grooves 12 and 38, the guide slot 42 corresponding with the annular groove 38 and the guide slot 43 corresponding with the annular groove 12. The guide slots 42 and 43 merge into the restrictive slot 19. The sleeve 16 and the separator sleeve 39 are provided at their top edges with horizontal flanges 44 and 45 equipped with screws 46 and 47 for vertical adjustment. The screw 46 adjusts the separator sleeve 39; it passes through the flange 44 of the sleeve 16 and engages in a threaded hole in the flange 45 of the separator sleeve 39. It reacts against the top edge of the housing 3. When the screw 46 is turned, the separator sleeve 39 is simply raised or lowered, while the sleeve 16 remains in position. The screw 47 is used for the vertical adjustment of the sleeve 16. It is screwed into the flange 44 and passes through the flange 45. When the screw 47 is turned, the sleeve 16 and its lower end 18 are raised or lowered, while the separator sleeve 39 remains in position. The screws 46 and 47 are disposed in alternation with one another at a pitch interval corresponding to one sixth of a circumference. The screw 48 is used to fix the vertical positions of the sleeve 16 and the separator sleeve 39 once adjusted. The screw 46 is screwed into a threaded hole in the housing 3. Between the end face of the housing 3 and the flange 45 and between the flange 45 and the flange 44, solid spacers 49 corresponding to the particular adjustment are arranged, these serving to fix the adjustment of the guide slots 42 and 43 and the restrictive slot 19. The fixing screws 48 are arranged between the screws 46 and 47 at pitch intervals corresponding to divisions of one eighteenth of a circumference. The material delivered from the plasticizer 2 passes via the semi-circular passage 37 into the annular grooves 12 and 38 which may be disposed eccentrically vis a vis the axis of the housing 3 and the axis of the die core 6. The eccentricity of the annular grooves 12 and 38 is so contrived that they have their largest cross section at the point of communication with the semi-circular passage 37, while the smallest cross section occurs at the opposite end. Referring now to FIGS. 6 and 8 at the location of the smallest cross section, the annular groove 12 exhibits a guide element 13 inserted into the housing 3, said guide element 13 possessing a pilot 14, the surface of which bears against the separator sleeve 39 and ensures that the material flowing from both sides through the annular groove 12 to the guide element 13 is deflected into the guide slot 43 without forming any residues. As seen in FIGS. 3 and 4, the annular groove 38 exhibits a corresponding guide element 50 which is held in a sealed relationship between the annular piston 26 and the separator sleeve 39 within the sleeve 16. The guide element 50 exhibits a flat end surface 52 to prevent rotation. The tip 51 of the guide element 50 bears against the separator sleeve 39 and ensures that the material flowing into the annular groove 38 is directed into the guide slot 42 without forming any residues.

As FIG. 2 shows, the guide slot 43 makes an angle $a$, the guide slot 42 an angle $b$, and the restrictive slot 19 an angle $c$ with respect to the vertical. The guide slots 42 and 43 are identical in width if the two layers forming the hollow string of material are to have the same wall thicknesses; the width of the restrictive slot 19 corresponds to the sum of the widths of the guide slots 42 and 43. If a change in the widths of the guide slots 42 and 43 is necessary, first the separator sleeve 39 is raised by a corresponding amount, and then the sleeve 16 is raised by half that amount in order to maintain the width ratio between the guide slots 42 and 43 and the restrictive slot 19. If it is required that the wall thickness of the two layers which form the hollow string of material should be different, than the angles $a$, $b$, and $c$ are correspondingly modified relative to the vertical at the time the head is built, so that the sum of the two guide slots corresponds to the restrictive slot.

At its front end the sleeve 16 is tapered inwards. The taper forms in relation to the internal wall of the housing 3 and the annular restrictive slot 19. The restrictive slot 19 is adjoined by an annular ram chamber 7' formed between the die core 6 and the housing 3, said chamber supplying the plasticized material formed from the two layers to the annular opening 7 defined by the die housing 4 and the die center 5.

In the ram chamber 7' between the sleeve 16 and the die core 6, the annular piston 26 is located, its facility for axial displacement increasing and reducing the volume of the chamber 7'. The housing 3 is connected through a sleeve 8 containing openings 9 to a hydraulic cylinder 30, whose annular piston 28 is rigidly connected to the annular piston 26 of the extrusion head or frictionally connected to the annular piston 26 of the extrusion head 3. The hydraulic cylinder 30 is adjoined by a piston and cylinder arrangement 23, the piston 24 of which is connected to the die core 6 so that, by the introduction of a pressurized medium through one of the lines 25, the die core 6 can be raised and lowered in order to adjust the size of the annular opening 7. At the bottom end of the piston 28 there is a horizontal actuating rod 27 which is used to operate a control device. The annular piston 28 exhibits a shoulder 33; and above the latter fitted between said shoulder and a collar 29, a sealing ring 34 is provided which slides over the sides of the interior wall of the hydraulic cylinder 30 when annular piston 28 is raised and lowered. At the top end of the hydraulic cylinder 30 there is a connection 31 for a line carrying a pressurized fluid medium in order to produce the downward motion of annular piston 28. In the bottom zone of the annular piston 28 there is a connection 32 for a second such fluid carrying line, the function of which is to supply fluid in order to raise the annular piston 28.

Beneath the connection 32 there is a sealing ring 35 which abuts a stop and which is held in sealing engagement with the hydraulic cylinder by a screwed ring 36.

As FIG. 2 shows, that edge of the separator sleeve 39 which engages in the guide slots 42 and 43 is tapered in design so that both its sides extend parallel to the walls of the slots 42 and 43.

In a modified embodiment in accordance with FIG. 9, the guide slots 42 and 43 have cross sections which taper towards the restrictive slot 18. The separator slot 39 is not chamfered at those of its sides facing the annular groove 12, whereas at that side facing the annular groove 38 it is chamfered, the chamfer being disposed at an angle vis a vis the vertical which corresponds to the angle $b$ less the angle $a$.

FIG. 10 illustrates the arrangement of the two extruders 2 and 2', one of which opens into the annular groove 12 and the other into the annular groove 38. The guide elements 13 and 50 have been indicated by circles.

FIG. 11 illustrates an embodiment in accordance with FIG. 10 in which a semi-circular passage corresponding to passage 37 in FIG. 1 is provided, one end of which opens into the annular groove 12 and the other into the annular groove 38, and which is centrally connected to an extruder 2. In the embodiments in accordance with FIGS. 10 and 11, the plasticized material introduced into the annular grooves 12 and 38 covers a flow path corresponding to 360°.

FIG. 12 illustrates another embodiment in which both annular grooves 12 and 38 exhibit two mutually opposite inlets for the plasticized material, the inlets of the two passages being staggered by 90° in relation to one another. One inlet for the annular groove 12 is connected with one inlet for the annular groove 38 through a circular arcuate passage 37' so that two such arcuate passages 37' are created. The centers of the two circular arcuate passages 37' are connected together by a semi-circular passage 53 to the center of which an extruder 2 is connected. The semi-circular passage 53 is located in the housing 3 above the passages 37'. In this embodiment, where only one extruder 2 is used, the plasticized material has to cover a distance of twice 90° in the annular grooves 12 and 38 before it comes into contact with the guide element. It is equally possible to use two extruders, the semi-circular passage 53 then being dispensed with and respective extruders 2 and 2' being connected to the centers of the circular arcuate passages 37' (see FIG. 13).

FIG. 14 illustrates an embodiment in which three extruders 2 are used. In this embodiment the plasticized material covers a distance in the annular groove 12 and 38 of twice 60° before coming into contact with a guide element.

FIG. 15 illustrates the arrangement of four extruders 2 in which the plasticized material covers a path of twice 45° in the annular grooves 12 and 38 before coming into contact with a guide element. The short flow path covered by the plasticized material in the annular grooves 12 and 38 is particularly advantageous when dealing with large-diameter extrusion heads.

If the two layers of the tubular material are to be made of different materials, then an embodiment in accordance with FIG. 10 can be used, where each annular groove 12 and 38 is supplied from its own extruder, the two extruders being charged with different materials.

Again, a modification of the kind shown in FIG. 13 can be employed in which the distributor passages 37' are omitted and an extruder is connected to each inlet passage of the grooves 12 and 38, i.e., a total of four extruders in the manner shown in chain-dotted fashion, in each case two diametrically opposite extruders being supplied with the same material.

Although several examples of the present invention have been disclosed, it should also be understood by those skilled in the art of extrusion heads that other forms of the present invention may be had, all coming within the spirit of the invention and the scope of the appended claims.

I claim:

1. An extrusion head for the manufacture of a hollow string of thermoplastic material consisting of two concentric layers, the weld seams of which are circumferentially staggered in relation to one another, said extrusion head comprising:
   at least one inlet passage arranged transversely in said extrusion head;
   a ram chamber extending axially with respect to said extrusion head and having an annular volume to accommodate an axially displaceable annular piston;
   means operatively associated with said ram chamber for deflecting and distributing said thermoplastic material into said ram chamber;
   a die core downstream of said ram chamber;
   a sleeve disposed concentrically with respect to said die core in said extrusion head, said sleeve having a tapered end which is disposed toward an exit slot in said extrusion head;
   means operatively associated with said annular piston for axially displacing said annular piston;
   means operatively associated with said die core; for axially displacing said die core;
   said means for deflecting and distributing said thermoplastic material comprising:
   a first annular groove surrounding said sleeve, an internal wall of said groove being formed by said sleeve; a second annular groove corresponding to said first annular groove and located along with said first annular groove in a horizontal central plane;
   a longitudinally displaceable separator sleeve which passes through said first and second annular grooves, said separator sleeve having an opening;
   two inlet passages located above said first and second annular grooves, said inlet passages being staggered peripherally in relation to one another with one of said inlet passages opening into said first annular groove and the other of said inlet passages opening into said second annular groove via said opening in said separator sleeve;
   two guide slots of selected widths which merge into said restrictor slot, said guide slots being formed by one end of said separator sleeve passing through said first and second annular grooves; and
   a restrictive slot formed by said tapered end of said sleeve, said restrictive slot providing a passageway through which said thermoplastic material can enter said ram chamber,
   said restrictive slot having a width which corresponds to the sum of the widths of said guide slots.

2. The extrusion head defined in claim 1 wherein said guide slots and said restrictive slot are arranged at such angles to the vertical that, with the displacement of said separator sleeve and said sleeve, the width ratios of said guide slots to said restrictive slots are maintained.

3. The extrusion head defined in claim 2 wherein in maintaining the same width of said guide slots the sine of the angle $b$ of one guide slot $b$ associated with said second annular groove corresponds approximately to twice the sine of the angle $a$ of said other guide slot associated with said first annular groove, and the sine of the angle of said restrictive slot corresponds approximately to four times the sine of the angle $a$.

4. The extrusion head defined in claim 1 wherein a guide element assigned to the point of confluence of the thermoplastic material in said second annular groove is assembled in a sealing relationship between said annular piston and said separator sleeve being secured against rotation in said sleeve.

5. The extrusion head defined in claim 4 wherein the cross section of said first and second annular grooves decreases linearly from said inlet passages to said guide element arranged at the point of confluence.

6. The extrusion head defined in claim 1 wherein each of said inlet passages leading to said first and second annular grooves are connected by a semi-circular distributor passage extending over an angle of 90° and fed centrally from an extruder connected to each of said inlet passages.

7. The extrusion head as claimed in claim 5 further comprising semi-circular distributor passages, the centers of said distributor passages being connected by said distributor passages, said distributor passages being fed centrally from an extruder.

8. The extrusion head as claimed in claim 5 characterized in that each annular groove possesses three inlet passages staggered in relation to one another at angles of 120°; and in that respective ones of the inlet passages belonging to each annular groove are connected together by a distributor passage extending over an angle of 60° and fed centrally from an extruder.

9. The extrusion head as claimed in claim 5 characterized in that each annular groove is provided with four inlet passages arranged diametrically opposite one another in pairs and staggered in relation to each other; and in that respective ones of the inlet passages belonging to each annular groove are connected together by a distributor passage extending over an angle of 45° and fed centrally from an extruder.

10. An extrusion head as claimed in claim 9 characterized in that the centers of two distributor passages at a time are connected by a further distributor passage extending over an angle of 90° and fed centrally from an extruder.

11. The extrusion head defined in claim 1 wherein the two guide slots are of identical widths.

12. The extrusion head defined in claim 1 wherein the two guide slots are of differing widths.

* * * * *